United States Patent [19]
Shaklik

[11] Patent Number: 5,931,490
[45] Date of Patent: Aug. 3, 1999

[54] INTEGRATED STEERING WHEEL AND AIRBAG MODULE

[75] Inventor: Brian M. Shaklik, Fruit Heights, Utah

[73] Assignee: Autoliv ASP, Inc., Ogden, Utah

[21] Appl. No.: 08/915,869

[22] Filed: Aug. 21, 1997

[51] Int. Cl.$^6$ ................................... B60R 21/20
[52] U.S. Cl. ...................... 280/728.2; 280/731
[58] Field of Search .................. 280/728.2, 731

[56] References Cited

U.S. PATENT DOCUMENTS

| | | | |
|---|---|---|---|
| 5,267,486 | 12/1993 | Niwa et al. | 280/731 |
| 5,505,483 | 4/1996 | Taguchi et al. | 280/728.2 |
| 5,542,692 | 8/1996 | Shaklik et al. | 280/728.2 |
| 5,562,301 | 10/1996 | Lutz | 280/728.2 |
| 5,584,501 | 12/1996 | Walters | 280/728.2 |
| 5,597,177 | 1/1997 | Matsuura | 280/731 |

*Primary Examiner*—Kenneth R. Rice

[57] ABSTRACT

An integrated steering wheel and airbag module. The steering wheel includes a base having a mounting hole sized to receive an inflator. Received within the mounting hole is a resilient support block. The inflator is placed in the mounting hole over the support block, and a mounting plate clamps the inflator against the support block. The cushion may include tabs which extend through the mounting plate and are secured to fasteners. The inflator and cushion are thus secured using only the base of the steering wheel, the support block, and the mounting plate. A decorative cover completes the module, with a skirt of the cover being secured to the outer periphery of the steering wheel base.

15 Claims, 1 Drawing Sheet

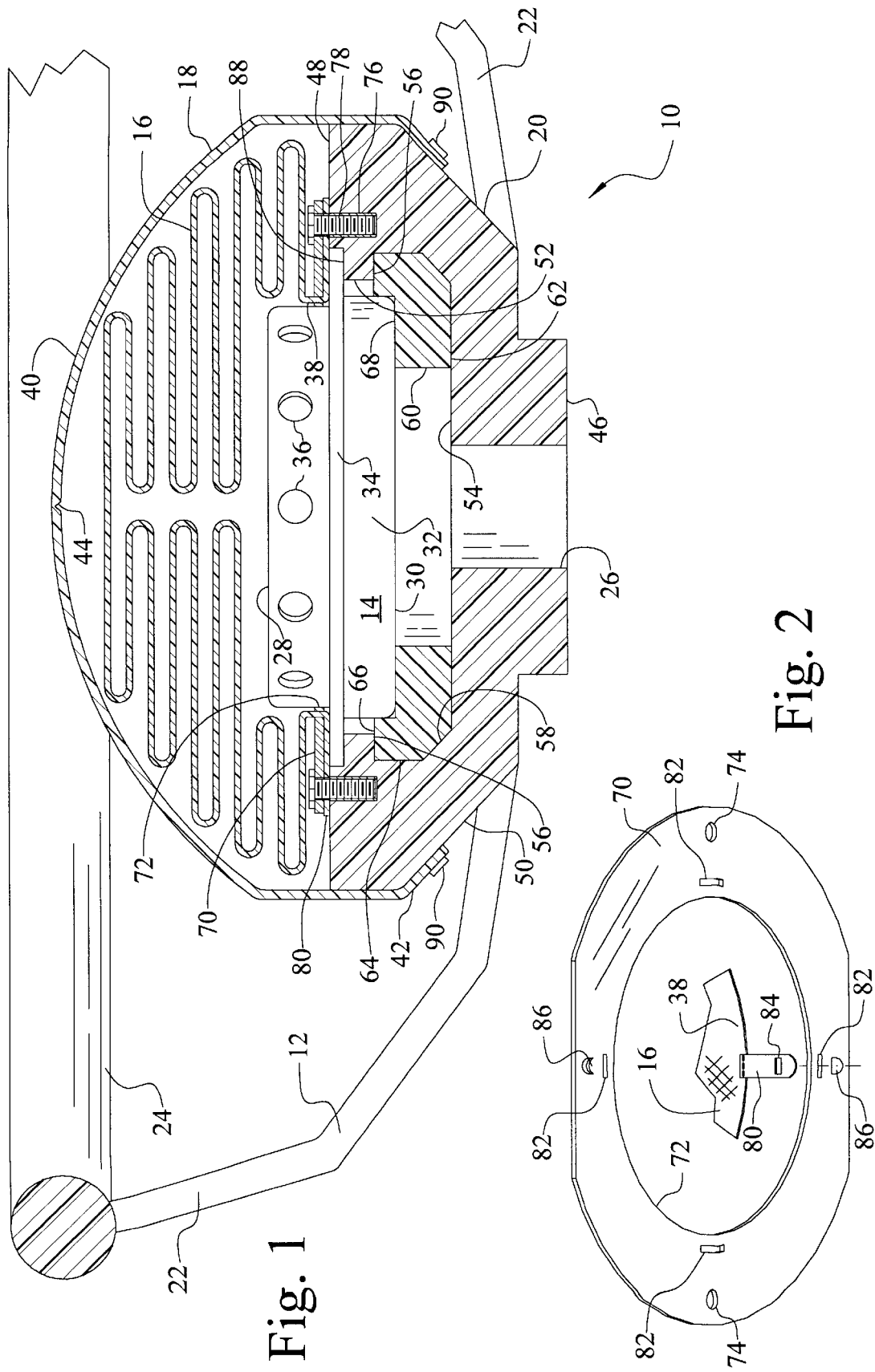

INTEGRATED STEERING WHEEL AND AIRBAG MODULE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the mounting of airbag modules to vehicle steering wheels. In particular, the present invention relates to an improved integrated steering wheel and airbag module.

The use of airbag restraint systems in vehicles is now well known. Such systems typically include a controller for determining when a collision occurs, an inflator activated by the controller for producing a quantity of inflation gas, and a cushion inflated by the gas. The inflated cushion lessens the impact force to protect the vehicle occupant. For protecting the driver of the vehicle, it is common to mount at least the inflator and cushion to the steering wheel.

Inflators to be mounted to steering wheels typically take the form of discs, with the longitudinal axis of the disc oriented generally parallel to the axis of rotation of the steering wheel. Such inflators have typically included mounting flanges extending outward from their peripheries. The open mouth of the cushion was typically placed upon this mounting flange, and a retaining ring (within the mouth of the cushion) was used to clamp the mouth of the cushion in place on the inflator.

This combination was then fastened to a mounting bracket. Finally, the mounting bracket was fastened to the steering wheel. While this arrangement as been serviceable, there is a continuing desire to simplify designs to reduce cost (material and assembly) and weight.

SUMMARY OF THE INVENTION

An object of the present invention is to provide an airbag module providing reliable operation to protect a vehicle driver.

Another object of the present invention is to provide such a module which is simple and light weight.

Yet another object of the present invention is to provide such a module which combines elements of the steering wheel and the module to reduce the number of required parts.

These and other objects are achieved by an integrated steering wheel and airbag module. The steering wheel includes a base having a mounting hole sized to receive an inflator. Received within the mounting hole is a resilient support block. The inflator is placed in the mounting hole over the support block, and a mounting plate clamps the inflator against the support block. The cushion may include tabs which extend through the mounting plate and are secured to fasteners. The inflator and cushion are thus secured using only the base of the steering wheel, the support block, and the mounting plate. A decorative cover completes the module, with a skirt of the cover being secured to the outer periphery of the steering wheel base.

BRIEF DESCRIPTION OF THE DRAWINGS

The objects and features of the invention noted above are explained in more detail with reference to the drawings, in which like reference numerals denote like elements, and in which:

FIG. 1 is a side view, in partial cross-section, of an integrated steering wheel and airbag module according to the present invention; and FIG. 2 is a detail perspective view illustrating the attachment of the cushion according to the present invention.

DETAILED DESCRIPTION OF THE INVENTION

With reference to FIG. 1, an integrated steering wheel and airbag module according to the present invention is generally designated by reference numeral 10. The steering wheel/module 10 generally includes a steering wheel 12, an inflator 14, a cushion 16 and a cover 18. Several aspect of these components may be similar to those well known in the art, and these aspects will be described first.

The steering wheel 12 includes a base 20 from which extend a plurality of spokes 22, with the outer ends of the spokes supporting a generally annular grip 24 adapted to be held by the driver for steering the vehicle, as is known in the art. The base 20 may include a column opening 26 (or other appropriate arrangement) for attachment to the steering mechanism of the vehicle.

The inflator 14 has the general form of a disc, with the longitudinal axis of the disc oriented generally parallel to the axis of rotation of the steering wheel in use. Keeping with this disc shape, the inflator 14 will have a metal housing which includes circular top and bottom walls 28 and 30, respectively, which are held in spaced, opposed relation by a tubular side wall 32. As shown, the inflator 14 will include an upward (i.e., toward the top wall 28) facing shoulder. In the preferred arrangement this shoulder is formed by a mounting flange 34 extending outward from the side wall 32 at a position intermediate the top wall 28 and bottom wall 30. The mounting flange 34 could, however, be eliminated, so long as there is created by a stepped diameter in the side wall 32 (i.e., with the portion adjacent the bottom wall 30 having a larger diameter) to form the shoulder. The inflator 14 will include a plurality of gas exit ports 36, either in the top wall 28, or in the side wall 32 adjacent the top wall 28. If located in the side wall 32, the gas exit ports 36 are located between the mounting flange 34 and top wall 28 (or between the shoulder (not shown) and the top wall 28).

The cushion 16 is formed of any appropriate fabric or film, and may have any inflated form appropriate for protecting the vehicle driver. Prior to inflation, the cushion 16 will be folded for storage within the cover 18. The cushion 16 will include a mouth 38 having a size and shape to fit loosely over the side wall 32 of inflator 14, so that when assembled the gas exit ports 36 will be within the interior of the cushion 16, as shown. As may be envisioned, the inflation gas from the inflator 14 will thus serve to inflate the cushion 16 upon activation of the inflator 14.

The cover 18 is preferably formed of a plastic material, and generally includes a front face 40 extending over the folded cushion 16 and opposed to the driver, and a peripheral skirt 42 extending from the front face 40. The front face 40 will typically include one or more weakened lines 44 which will rupture or tear when subjected to the force of the inflating cushion 16, to thus permit the cushion 16 to expand outward beyond the cover 18.

With these common features described, the novel features of the present invention will now be discussed.

Returning again to the steering wheel 12, the base 20 includes a rear face 46 furthest from the driver and a front face 48 closest to the driver, with both of these faces being generally normal to the axis of rotation of the steering wheel 12. Extending between the rear face 46 and front face 48 is an outer peripheral face 50. The outer peripheral face 50 may include a taper adjacent the rear face 46, as shown, for reasons made clear below. While the front face 48 has been shown as completely flat, this is not required, and different elevations are possible along the outer edge, as will be apparent from the discussion below. Extending into the front face 48 is a mounting hole 52 sized and shaped to loosely receive at least a portion of the inflator 14. As shown, the mounting hole 52 includes a bottom wall 54 spaced from the front face 48. The bottom wall 54 is placed such that the mounting hole 52 has a depth greater than that required to receive the inflator 14. The bottom wall 54 need not be continuous, but may include an opening onto the column opening 26 (or other openings) if desired.

The innermost portion of the mounting hole 52 is preferably undercut to form one or more retaining ledges 56 about the periphery of the mounting hole 52. This could even result in a single retaining ledge 56 running about the entire periphery of the mounting hole 52. The retaining ledges 56 serve to define a support cavity 58 within the base 20, which is in communication with the mounting hole 52.

Mounted within the mounting hole 52 (and within the support cavity 58 if used) is a resilient support block 60. The support block 60 may be formed of any appropriate elastomeric material, such as high-temperature rubber. The support block 60 includes a lower face 62 abutting the bottom wall 54, an outer peripheral face 64, and a top face 66. The outer peripheral face 64 may be sized to be closely received within the mounting hole 52. If the retaining ledges 56 are employed, however, it is preferred that the outer peripheral face 64 be sized and/or shaped to have a portion of the top face 66 received under the retaining ledges 56 with a tight fit. This use of the retaining ledges 56 will thus prevent unintended removal of the support block 60 from the mounting hole 52.

As noted above, the mounting hole 52 is sized to receive a portion of the inflator 14. The support block 60 is sized such that, in the assembled condition shown, the bottom wall 30 of the inflator 14 will abut the top face 66 of the support block 60. As may be seen, this will restrict movement of the inflator 14 in the longitudinal direction away from the driver. The top face 66 of the support block 60 may also include a depression 68 sized to closely receive the bottom wall 30, such that the peripheral edge of the depression 68 abuts the portion of the side wall 32 of inflator 14 adjacent the bottom wall 30. As such, the depression 68 may be used to restrict movement of the inflator 14 in directions normal to longitudinal.

With the inflator 14 thus restrained against movement away from the driver and movement normal thereto, all that remains for mounting is to restrict the movement of the inflator 14 towards the driver. For this, there is provided a mounting plate 70. The mounting plate 70 is a rigid element formed of metal, and includes an inflator opening 72 extending therethrough. The inflator opening 72 is sized such that it will closely receive the upper portion of inflator 14 (i.e., the portion adjacent the top wall 28), yet will abut against the mounting flange 34 (or the shoulder formed by the stepped diameter described above). The mounting plate 70 is sized to be larger than the mounting hole 52, such that it may be connected to the front face 48 of the base 20 in the assembled condition.

To secure the mounting plate 70 to the base 20, the mounting plate 70 may include a plurality of stud holes 74. These stud holes 74 will align with associated threaded holes 76 opening onto the front face 48 of the base 20. Appropriate mounting bolts 78 may thus be used to secure the mounting plate 70 to the front face 48, by extending through the stud holes 74 and engaging the threaded holes 76, as shown. It is noted that the threaded holes 76 may be formed by threaded metal sleeves molded into the base 20, if required for strength.

As may be seen, the abutment of the mounting plate 70 against the inflator 14 will thus serve to clamp the inflator 14 between the mounting plate 70 and the support block 60. In this regard, it is preferred that the support block 60 be compressed by the inflator 14 in this clamped condition, such that the support block 60 exerts a force against the inflator 14 to prevent rattling or other undesired noise. While the mounting plate 70 could clamp the mounting flange 34 against the front face 48 (in addition to the clamping against the support block 60), it is preferred that this not occur, and that a slight offset (not shown for clarity) be present between the mounting flange 34 and front face 48. In this regard it is noted that the mounting bolts 78 could extend through aligned holes (not shown) in the mounting flange 34 if desired. However, this is not required, and the mounting flange 34 may be made smaller (and therefore lighter and less expensive) if the mounting bolts 78 do not extend through the mounting flange 34.

While the above arrangement securely mounts the inflator 14 to the steering wheel 12, the cushion 16 must also be secured in position. This could be achieved by providing a separate retaining ring (not shown) as in the prior art, with the mouth 38 being clamped between such a retaining ring and the front face 48 (or the mounting plate 70). However, to avoid the expense of a separate retaining ring (and fasteners to secure it in position), it is preferred to employ the mounting plate 70 to additionally secure the cushion 16.

As noted above, the mouth 38 of the cushion could be inserted through the inflator opening 72 and folded radially outward, such that it is clamped between the mounting plate 70 and the front face 48. In the preferred embodiment, however, the mouth 38 includes a plurality of attachment tabs 80 (best shown in FIG. 2) extending therefrom. The mounting plate 70 further includes a like number of tab slots 82 extending therethrough at positions corresponding to the attachment tabs 80. As shown, the attachment tabs 80 are inserted through the tab slots 82, and then folded radially outward, such that they lie beneath the mounting plate 70 in the assembled condition of FIG. 1.

Simply being clamped between the mounting plate 70 and front face 48 may be sufficient to retain the attachment tabs 80 during inflation of the cushion 16. However, to ensure that the cushion 16 is not forced away from the inflator 14 during the rapid inflation, it is preferred to retain the attachment tabs 80. This may be achieved by providing each of the attachment tabs 80 with a tab hole 84 positioned to mate with the stud hole 74 when assembled. In this manner, the mounting bolts 78 may pass through the attachment tabs 80 to securely retain the tabs.

As an alternative, the mounting plate 70 may include a projection 86 (FIG. 2) associated with each of the tab slots 82. The projections 86 would preferably be formed by striking out a portion of the mounting plate 70, as shown. The attachment tabs 80 would then include the tab holes 84 positioned to mate with, and receive, the projections 86. As the preferred alternative, a portion of the attachment tabs 80 are retained by the mounting bolts 78, and the remainder of the attachment tabs 80 are retained by projections 86, as shown in FIG. 2. This arrangement is similar to that shown in U.S. Pat. No. 5,542,692 to Shaklik et al.

As a final note in this regard, to more securely retain the attachment tabs 80 it may be preferred to truly clamp them between the mounting plate 70 and front face 48. Such a true clamping may be prevented if the inflator 14 includes the mounting flange 34, since the mounting flange 34 is interposed between the mounting plate 70 and front face 48. In other words, the mounting flange 34 could serve to space the mounting plate 70 from the front face 48. This would prevent true clamping of the attachment tabs 80.

To avoid this problem, the front face 48 may include an flange depression 88 to receive the mounting flange 34, as shown. The flange depression 88 preferably has a depth slightly greater than that of the mounting flange 34. This will ensure the desired clamping of the inflator 14 between the support block 60 and mounting plate 70, rather than between the flange depression 88 and mounting plate 70.

In the assembled form, the cushion 16 will be folded in an appropriate manner to occupy a small volume over the inflator 14. Various straps, bags, etc. (not shown) could be employed to retain the cushion in this folded condition. To further protect the cushion 16, and to provide a pleasing appearance, the cover 18 is provided. As noted above, the cover 18 includes the front face 40 and skirt 42 extending from its periphery.

To secure the cover 18 in position, the skirt 42 could include appropriate mounting holes to mate with the threaded holes 76. The skirt 42 could then be folded radially inward to underlie the mounting plate 70 and be clamped in position. This is not preferred, however, as it presents clamping problems similar to those discussed above. Instead, it is preferred that the skirt 42 be affixed to the outer peripheral face 50 of the base 20 of steering wheel 12. This may be achieved by various means, such as threaded fasteners 90.

In this regard, it is preferred that the base 20 include the tapered portion adjacent the rear face 46, and that the skirt 42 extend to, and be fastened at, this tapered portion as shown. With this arrangement a cowling (not shown) affixed to the vehicle dashboard may extend outward to the outer peripheral face 50 of the base 20, overlying the tapered portion and partially obscuring the fasteners 90. This provides a simple attachment method, and an aesthetically pleasing final appearance.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An integrated steering wheel and airbag module, comprising:

a steering wheel having a base, said base including a front face to be mounted in a position opposed to a driver, and a mounting hole extending into said front face, said mounting hole having a bottom wall;

a resilient support block received within said mounting hole and abutting said bottom wall;

an inflator having an upwardly facing shoulder, a portion of said inflator being received within said mounting hole and abutting said support block; and a mounting plate having a inflator opening, said inflator opening surrounding said inflator and abutting against said shoulder, said mounting plate being secured to said base, and clamping said inflator against said support block.

2. A module as in claim 1, further including a cushion having a mouth, said mouth being secured by said mounting plate.

3. A module as in claim 2, further including a cover having a front face and a skirt extending from a periphery of said front face, said skirt being secured to said base.

4. A module as in claim 3, wherein said base further includes an outer peripheral face, and said skirt is secured to said outer peripheral face.

5. A module as in claim 1, wherein said support block includes a top face with a depression formed therein, said depression receiving said inflator.

6. A module as in claim 5, wherein said shoulder is a mounting flange.

7. A module as in claim 5, wherein said mounting hole is undercut to form at least one retaining ledge, and wherein said top face of said support block abuts against said retaining ledge.

8. A module as in claim 1, further including a cushion having a mouth, said cushion including a plurality of attachment tabs extending therefrom, each of said tabs having a tab hole, and wherein said mounting plate further includes a plurality of projections extending therefrom, and a portion of said attachment tabs are each retained by receipt of an associated one of said projections in said tab hole.

9. A module as in claim 8, wherein said mounting plate includes a plurality of stud holes, and said mounting plate is secured to said front face of said base by mounting bolts extending through said stud holes, and wherein a remainder of said attachment tabs are each retained by receipt of an associated one of said mounting bolts in said tab hole.

10. A module as in claim 9, wherein said mounting plate further includes a plurality of tab slots extending therethrough, each of said attachment slots extending through an associated one of said tab slots.

11. A module as in claim 10, wherein said support block includes a top face with a depression formed therein, said depression receiving said inflator.

12. A module as in claim 11, wherein said shoulder is a mounting flange.

13. A module as in claim 11, wherein said mounting hole is undercut to form at least one retaining ledge, and wherein said top face of said support block abuts against said retaining ledge.

14. A module as in claim 13, further including a cover having a front face and a skirt extending from a periphery of said front face, said skirt being secured to said base.

15. A module as in claim 14, wherein said base further includes an outer peripheral face, and said skirt is secured to said outer peripheral face.

* * * * *